US012331920B2

(12) United States Patent
Meise

(10) Patent No.: US 12,331,920 B2
(45) Date of Patent: Jun. 17, 2025

(54) LIGHTING DEVICE WITH LIGHT DISTRIBUTION BODY

(71) Applicant: PARO Holding GmbH, Starnberg (DE)

(72) Inventor: Axel Meise, Munich (DE)

(73) Assignee: PARO HOLDING GMBH, Starnberg (DE)

(*) Notice: Subject to any disclaimer, the term of this patent is extended or adjusted under 35 U.S.C. 154(b) by 0 days.

(21) Appl. No.: 18/565,217

(22) PCT Filed: May 31, 2022

(86) PCT No.: PCT/EP2022/064736
§ 371 (c)(1),
(2) Date: Nov. 29, 2023

(87) PCT Pub. No.: WO2022/253821
PCT Pub. Date: Dec. 8, 2022

(65) Prior Publication Data
US 2024/0255115 A1 Aug. 1, 2024

(30) Foreign Application Priority Data
May 31, 2021 (DE) ............ 10 2021 114 005.6

(51) Int. Cl.
*F21V 3/10* (2018.01)
*F21V 8/00* (2006.01)
(Continued)

(52) U.S. Cl.
CPC .............. *F21V 3/10* (2018.02); *F21V 21/14* (2013.01); *G02B 6/0028* (2013.01);
(Continued)

(58) Field of Classification Search
CPC ......... F21V 3/10; F21V 21/14; G02B 6/0028; G02B 6/0033; F21Y 2113/13; F21Y 2115/10
See application file for complete search history.

(56) References Cited

U.S. PATENT DOCUMENTS

2011/0286200 A1* 11/2011 Iimura ............... F21V 13/08
362/84
2013/0121002 A1* 5/2013 Lin ................. F21V 3/062
362/296.04
(Continued)

FOREIGN PATENT DOCUMENTS

DE 202016102638 U1 8/2017
JP 2012069370 A * 4/2012
WO WO 1997/033124 A1 9/1997

OTHER PUBLICATIONS

Hiki, JP,2012-069370,A, machine translation, Apr. 2012 (Year: 2012).*
(Continued)

*Primary Examiner* — Tracie Y Green
(74) *Attorney, Agent, or Firm* — Frost Brown Todd LLP

(57) ABSTRACT

Within the scope of the present invention, a lighting device, in particular for lighting an interior, is specified, which comprises a lighting means 3, and a light distribution body 1 having a light coupling-in surface 11 and a translucent light exit region 12; wherein the light distribution body 1 is configured to emit a first part of the light emitted by the lighting means 3 and introduced into the light distribution body 1 via the light coupling-in surface 11 in a directed manner, and to scatter a second part of the introduced light by means of the light distribution body 1, so that the light exits diffusely substantially over the entire light exit region 12 of the light distribution body 1.

12 Claims, 4 Drawing Sheets

(51) Int. Cl.
*F21V 21/14* (2006.01)
*F21Y 113/13* (2016.01)
*F21Y 115/10* (2016.01)

(52) U.S. Cl.
CPC ......... *G02B 6/0033* (2013.01); *F21Y 2113/13* (2016.08); *F21Y 2115/10* (2016.08)

(56) References Cited

U.S. PATENT DOCUMENTS

2016/0010828 A1* 1/2016 Bergenek ................ F21V 5/046
362/268
2023/0341107 A1* 10/2023 Di Trapani ............... F21V 5/04

OTHER PUBLICATIONS

International Preliminary Report on Patentability dated Nov. 21, 2023 for Application No. PCT/EP2022/064736, 6 pages.

* cited by examiner

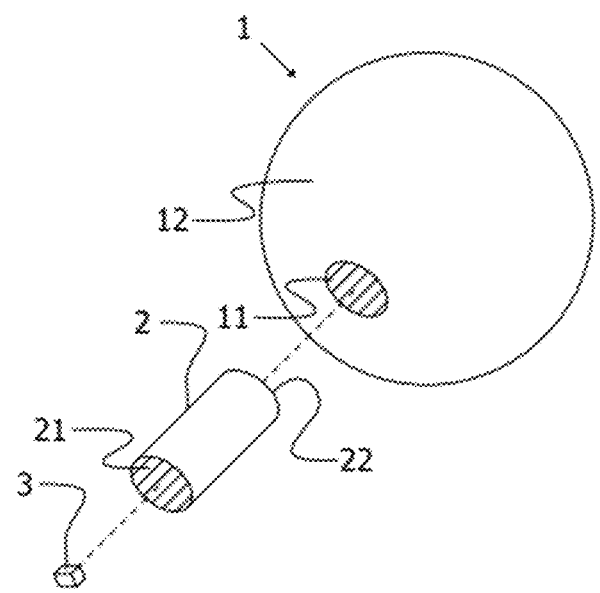
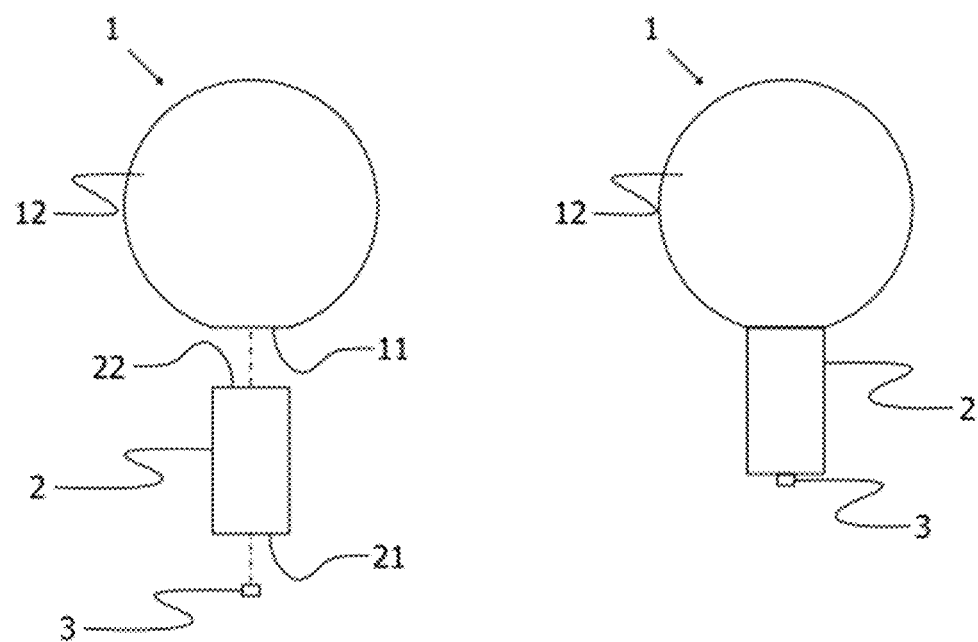
Fig. 1
Fig. 2　　　　Fig. 3

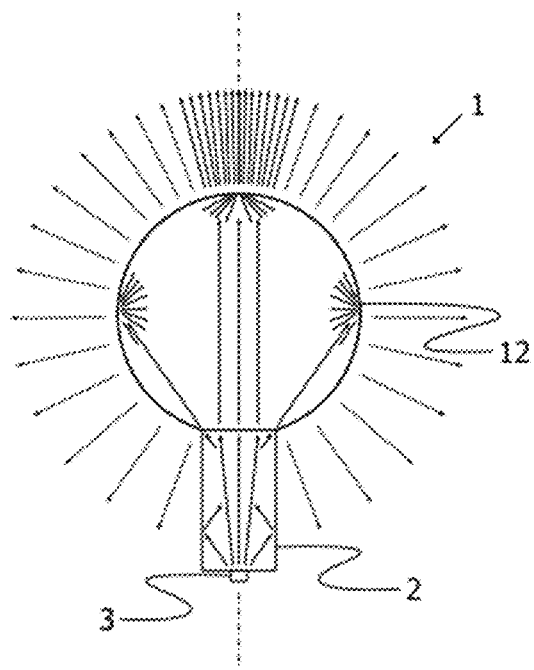
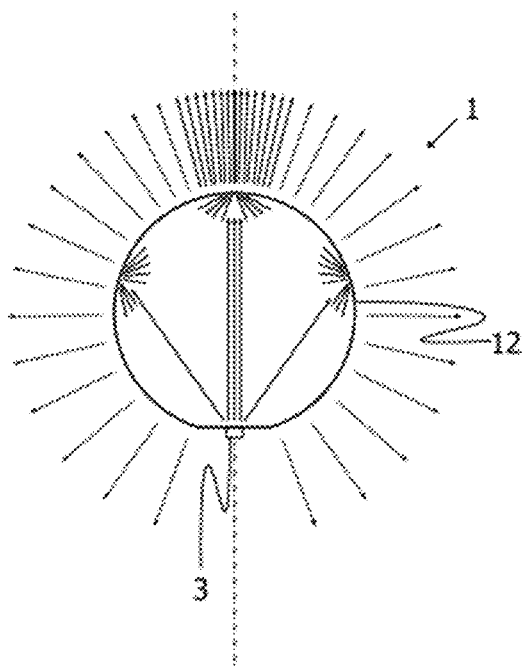
Fig. 4
Fig. 5
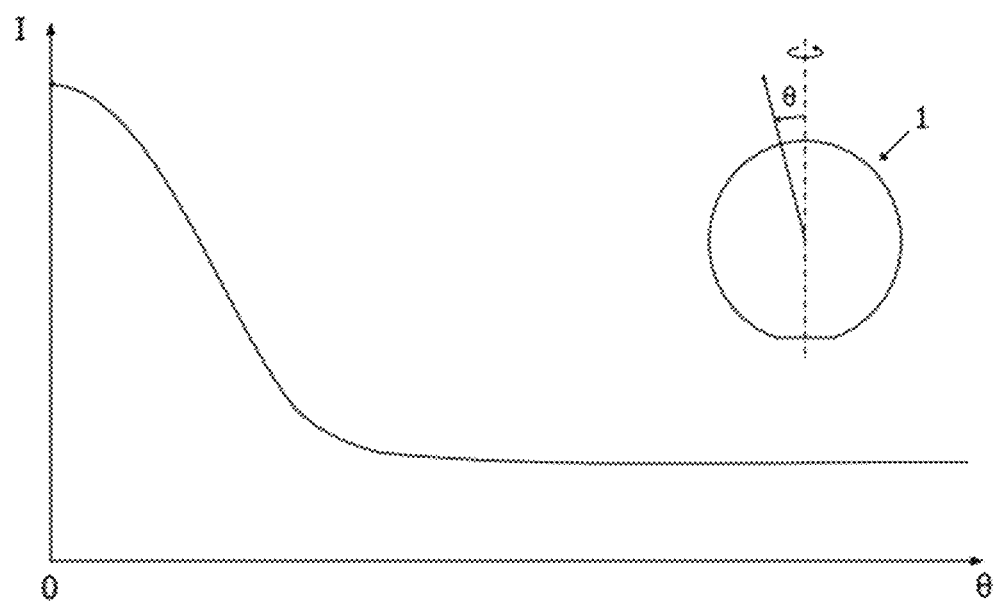
Fig. 6

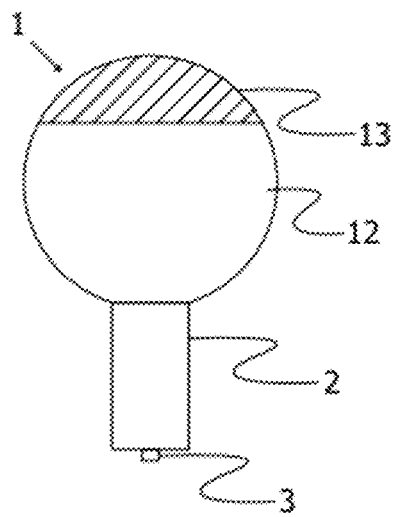
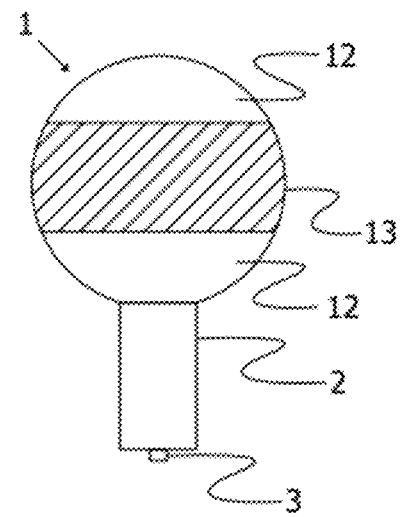
Fig. 7          Fig. 8
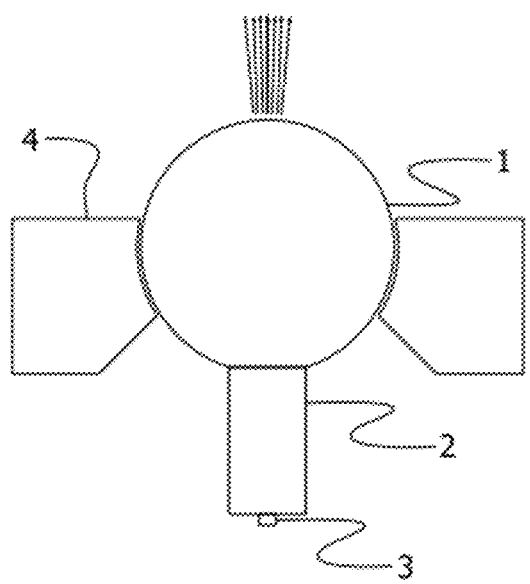
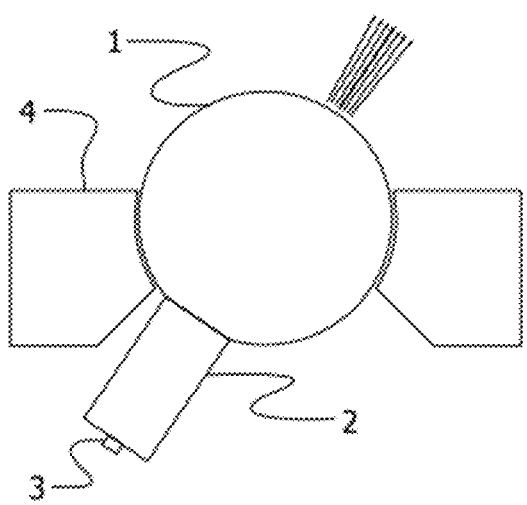
Fig. 9          Fig. 10

LIGHTING DEVICE WITH LIGHT DISTRIBUTION BODY

The present invention relates to a lighting device with a light distribution body according to the subject matter of claim 1.

Lighting devices with different emission characteristics are known, which are respectively suitable for lighting purposes in different applications. Thus, for example, lighting devices are known which have a diffuse emission characteristic. Such lighting devices are suitable to uniformly illuminate a space over a large region. On the other hand, lighting devices are known which are designed to emit directed light, such as spot lights or flood lamps. With such lighting devices, a limited space region can be illuminated in a targeted manner.

In many cases, it is desirable to use both emission characteristics simultaneously for the lighting of a space, for example in work spaces with a workplace. There, it is desirable to uniformly illuminate the space and at the same time to be able to provide increased lighting of the workplace. Likewise, in order to generate a pleasant room mood, it is often desirable to combine a diffuse lighting of the space with a directed lighting of specific space regions.

In the prior art, different lights are known which combine different lighting means with different emission characteristics for the simultaneous generation of diffuse and directed light. Thus, for example, DE 20 2016 102 638 U1 discloses a hybrid light which comprises at least one LED lighting means for emitting a directed light flux and at least one planar OLED lighting means for emitting a diffuse light flux. Since the hybrid light requires separate lighting means for providing the different beam characteristics, the space requirement and the effort in production are increased.

Against this background, the object of the present invention is to specify a lighting device which is suitable for emitting directed and diffuse light. Furthermore, the present invention is intended to specify a lighting device which, despite the possibility of generating directed and diffuse light, is distinguished by a structurally simple and compact, space-saving construction.

The object is achieved by a lighting arrangement having the features of claim 1. Advantageous developments emerge from the dependent claims.

The object is achieved in particular by a lighting device, in particular for lighting an interior, comprising a lighting means for emitting light and a light distribution body having a light coupling-in surface and a translucent light exit region, wherein the light distribution body is configured to emit a first part of the light emitted by the lighting means and introduced into the light distribution body via the light coupling-in surface in a directed manner, and to scatter a second part of the introduced light by means of the light distribution body such that the light exits diffusely substantially over the entire light exit region of the light distribution body.

An essential concept of the invention is to provide a light distribution body and to configure it such that coupled-in light, which is emitted by a (single) lighting means, is emitted from the light distribution body in a diffuse manner in one part and in a directed manner in another part. A structurally simple and space-saving construction of a lighting device having two emission characteristics is thus achieved, since only one lighting means and one (comparatively compact) light distribution body are required.

The light distribution body here fulfills a double function. A (first) part of the light coupled into the light distribution body is guided and preferably directed in the interior of the light distribution body such that this part of the light emerges from the light distribution body in a directed manner. The directed portion of the coupled-in light preferably emerges over a partial region of the light exit region. A (second) part of the light coupled into the light distribution body is scattered or distributed by means of the light distribution body such that this part of the coupled-in light is emitted diffusely substantially over the entire light exit region, preferably over the entire light exit region. In this case, the diffusely emitted light is preferably scattered both when emerging from the surface of the light distribution body, which forms the light exit region, and in the case of internal reflections in the interior of the light distribution body. As a result of the internal reflections, the light is additionally distributed in the light distribution body.

The light distribution body thus generates a diffuse emission characteristic by the scattering of the one (first) part of the coupled-in light and a directed emission characteristic by the directed emission of the other (second) part of the coupled-in light. The light distribution body is thus configured according to the invention to emit light, which is coupled in via the light coupling-in surface, with an emission characteristic which represents a superposition of a diffuse emission characteristic and a directed emission characteristic. Advantageously, no separate lighting means or optical elements for modifying the emission characteristic are required for providing this emission characteristic.

The lighting device according to the invention has an emission characteristic which represents a superposition of a diffuse and a directed emission characteristic. Thus, with the lighting device according to the invention, a space, in particular an interior, can be uniformly illuminated with a single lighting means and at the same time a limited space region can be illuminated in a targeted manner with the directed light component.

Within the scope of the present invention, a diffuse light emission or emission characteristic is to be understood to mean a spatial emission pattern which has a substantially constant intensity over a large spherical angle range, preferably over a spherical angle range of $2\pi$ sr (steradian) or more. In contrast to this, a directed light emission or emission characteristic denotes a spatial emission pattern in which the emission is limited to a small spherical angle range of less than $2\pi$sr, preferably less than 1 sr. A directed light emission is therefore not limited to a collimated light emission, but rather also comprises a conical emission pattern with a small emission angle of preferably 45° or less.

According to a preferred embodiment of the invention, the lighting device comprises a light guide which is configured to guide light emitted by the lighting means to the light coupling-in surface of the light distribution body. The lighting means can thereby be arranged spaced apart from the light distribution body. This can be structurally advantageous. In addition, the distance between the lighting means and the light distribution body can be adjusted in a targeted manner by the light guide by the length of the light guide being selected accordingly. This can contribute to modifying the emission angle of the directed light component.

Any optical element with which light can be transported within the light guide between a coupling-in surface and a coupling-out surface of the light guide can be used as the light guide. For example, an optical waveguide can be used as the light guide. Likewise, elongate, for example cylindrical or prism-shaped elements made of a transparent material such as glass or a transparent plastic can be used as the light guide, in which the light emitted by the lighting means is coupled in via a base surface and coupled out via the base surface which is axially remote.

The light distribution body is preferably formed by a convex body made of a transparent material. The light distribution body preferably has a spherical geometry. The light distribution body is particularly preferably formed by a substantially spherical body. A substantially spherical body is to be understood to mean a body whose shape deviates only slightly from a spherical shape. For example, the deviation can be present in the form of local flattenings for forming the light coupling-in surface. Likewise, ellipsoids in which the difference in the length of the semi-axes is substantially smaller than the length of the shortest semi-axis (preferably no length difference of the semi-axes is more than 10% of the length of the shortest semi-axis) are to be understood as substantially spherical within the scope of the present description.

In order to ensure the light distribution function in the interior of the light distribution body, it is further preferred that the light distribution body is formed from a transparent material, preferably from glass or a transparent plastic. The light distribution body is preferably solid (that is to say without cavities) and preferably consists substantially completely of the transparent material.

With such a light distribution body, the directed portion of the emitted light can be realized in a structurally particularly simple manner. A light distribution body which is formed by a solid, substantially spherical body made of a transparent material is particularly preferred. In this configuration, a part of the light introduced into the light distribution body is bundled by the substantially spherical light distribution body. This part of the coupled-in light emerges from the light distribution body in a directed manner over a region of the light exit surface of the light distribution body which lies opposite the light coupling-in surface. The directed part of the emission of the coupled-in light can thus be realized in a particularly simple manner with a geometrically compact light distribution body which is simple to produce.

It is preferred here that the substantially spherical light distribution body has a diameter of more than 5 cm, particularly preferably between 5 cm and 50 cm.

According to a further preferred embodiment of the invention, the light exit region of the light distribution body is formed by a frosted surface. Specifically, the light exit region is formed by a frosted surface on a surface of the light distribution body. A diffuse light exit over the entire light exit region can thereby be provided in a particularly simple manner. The frosting of the light exit region can be generated in the usual manner by roughening of the surface, for example by etching or sandblasting.

In a preferred embodiment, the light distribution body is formed by a solid, substantially spherical body made of a transparent material, the surface of which is frosted with the exception of the light coupling-in surface. On account of the spherical shape, a (first) part of the coupled-in light is bundled and emerges in a directed manner over a surface region of the light distribution body or a part of the light exit region which lies opposite the light coupling-in surface. Another (second) part of the coupled-in light emerges diffusely at the frosted surface of the light distribution body (that is to say at the light exit region) and/or is reflected diffusely in the interior of the light distribution body at the frosted surface and then emitted diffusely over the frosted surface.

A lighting device can thus be formed which provides a particularly advantageous and aesthetically attractive combination of diffuse and directed emission characteristic using only one lighting means, which is particularly simple and inexpensive to produce, and which has a particularly compact construction. It has surprisingly been found that, when using a solid, spherical light distribution body made of a transparent material with a frosted surface as light exit region, a lighting device is provided in which the intensity of the light component which is emitted diffusely by the light distribution body has a satisfactorily high intensity over the entire light exit region, which is suitable for uniform and harmonious lighting, while the directed component of the emitted light is bright enough to illuminate a limited space region in a spotlike manner.

It is furthermore preferred that the light coupling-in surface is formed by a smoothly ground or polished region on the surface of the light distribution body. The coupling-in of light into the light distribution body is thereby facilitated. The light coupling-in surface can be of substantially planar configuration. The light coupling-in surface can likewise have a convex or concave shape. If a substantially spherical body is used as the light distribution body, a convexly shaped light coupling-in surface can be formed by polishing a surface region. Alternatively, a planar light coupling-in surface can be obtained by local grinding of the surface. If the lighting device comprises a light guide, the surface shape of the light coupling-in surface preferably corresponds to the surface shape of a light coupling-out surface of the light guide, in order to permit seamless attachment of the light guide to the light distribution body and thus to improve the light coupling-in.

The lighting means is preferably formed by one or more LEDs and is furthermore preferably configured as an LED cluster or LED RGB module. A luminous, energy-efficient and compact lighting means having low production costs can thus be provided.

The lighting device preferably comprises precisely one lighting means which is formed by an (individual) LED or an LED cluster or an LED module. If an LED RGB module is used as the lighting means, the colour of the light emitted by the lighting device can be adjusted variably. On account of the internal reflections and scatterings, the light distribution body in this case brings about a mixing of the light colours which are emitted by the individual LEDs of the LED RGB module. A light emission having a homogeneous colour is thereby achieved.

In a (further) preferred embodiment, the light distribution body has, on its surface, regions with a reflective coating which is configured to partially or completely reflect light which propagates in the interior of the light distribution body and impinges on the reflective coating.

By providing a reflective coating in regions, the emission characteristic of the light distribution body can be modified in a targeted manner. The emission of directed and/or diffuse light can be limited, for example, to specific spherical angle ranges or can be reduced in a targeted manner in specific regions. When using a light distribution body having a convex (in particular spherical) shape with a frosted surface, surface regions can be excluded from the light exit region by applying a reflective coating with total reflection in regions, since no light can emerge from the light distribution body in these regions.

According to a (further) preferred embodiment, the lighting device comprises a holder in which the light distribution body is mounted rotatably about its centre point. The direction of the directed emitted light can thereby be adapted in a simple manner by the user by the light distribution body being rotated in the holder. A substantially spherical light distribution body is particularly preferred in this embodiment, since it can be mounted rotatably about its centre point in a structurally simple manner.

It is furthermore preferred that the lighting device comprises a dome which partially or completely encloses the light distribution body. The surface of the light distribution body can thereby be protected from contamination and damage. This protection is advantageous in particular in the case of light distribution bodies with a frosted surface, since contaminations of the frosted surface can influence the diffusion effect and lead to a changed transmission behaviour.

According to a preferred development, the dome comprises surface regions with different transmittance, which are configured to modify the emission characteristic of the light distribution body. At least one surface region preferably comprises a partially reflective and/or a fully reflective coating. According to this development, the emission characteristic of the lighting device can be modified by corresponding formation of the dome without the light distribution body having to be changed. Suitable emission characteristics of the lighting device can thereby be realized depending on the application. In addition, an aesthetically advantageous configuration of the lighting device can be realized.

The invention is also described below with regard to further details, features and advantages, which are explained in more detail with reference to the figures. The described features and feature combinations, as shown below in the figures of the drawing and described with reference to the drawing, can be applied not only in the respectively specified combination but also in other combinations without thereby departing from the scope of the invention.

In the figures:

FIG. 1 shows a perspective exploded illustration of a lighting device with a light distribution body according to a preferred exemplary embodiment of the present invention;

FIG. 2 shows an exploded illustration of the lighting device from FIG. 1 in section;

FIG. 3 shows a sectional illustration of the lighting device from FIG. 1 in the assembled state;

FIG. 4 shows a schematic illustration of the emission characteristic which can be achieved with the lighting device according to the exemplary embodiment shown in FIGS. 1 to 3;

FIG. 5 shows an illustration of a variant of the exemplary embodiment shown in FIG. 4 with a schematic illustration of the achievable emission characteristic;

FIG. 6 shows a graph which qualitatively represents the angle dependence of the emission characteristic which can be generated with the lighting devices shown in FIGS. 4 and 5;

FIG. 7 shows a schematic sectional view of a lighting device with a light distribution body according to a further preferred exemplary embodiment of the present invention with a modified emission characteristic;

FIG. 8 shows a schematic sectional view of a lighting device with a light distribution body according to a further preferred exemplary embodiment of the present invention with a modified emission characteristic;

FIGS. 9 and 10 show a schematic sectional view of a lighting device with a light distribution body according to a further preferred exemplary embodiment of the present invention with a holder for the light distribution body;

The figures are merely schematic in nature and serve exclusively for understanding the invention. Identical or similar elements are provided with the same reference signs in the description of the exemplary embodiments.

Figure 11:
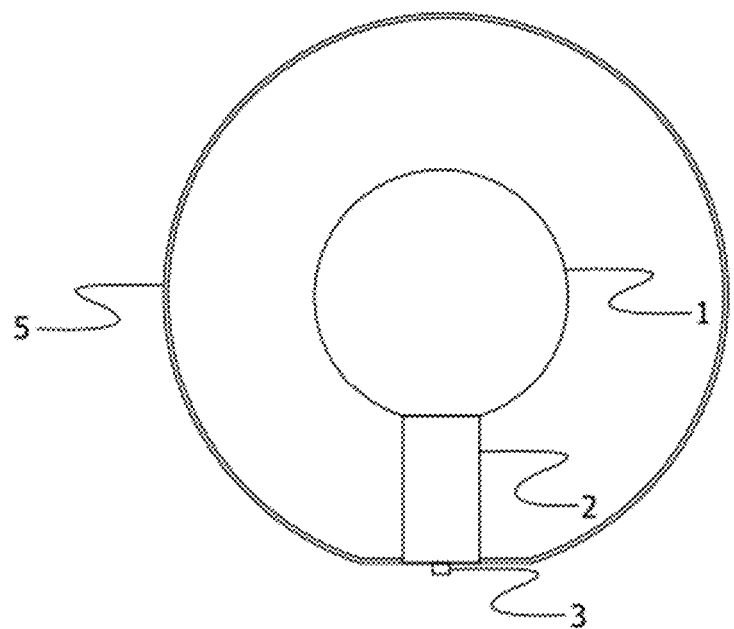
FIG. 11 shows a schematic sectional view of a lighting device with a light distribution body according to a further preferred exemplary embodiment of the present invention with a dome.

FIG. 1 shows a perspective exploded illustration of a lighting device according to a preferred exemplary embodiment of the present invention. The lighting device comprises as main components a lighting means 3, a light guide 2 and a light distribution body 1.

The lighting means 3 is preferably formed by an LED or an LED unit made of a plurality of LEDs, for example an LED cluster or an LED module, but is not limited thereto. The lighting means 3 is configured to emit light in the direction of the light guide 2 and of the adjoining light distribution body 1.

The light guide 2 is formed by an elongate, substantially cylindrical body made of a transparent material, the longitudinal axis of which extends along a central axis of the lighting device. The central axis is illustrated in the exploded illustration of FIG. 1 as a dash-dotted line. At the axial ends, the light guide 2 respectively comprises a light coupling-in surface 21 and a light coupling-out surface 22. The light coupling-in surface 21 and the light coupling-out surface 22 are preferably surfaces having a high transmittance, which can be achieved for example by corresponding polishing and/or application of a suitable coating. The lateral surface of the light guide 2 can be provided with a suitable reflective coating to improve the light transmission between the lighting means 3 and the light distribution body 1. Alternatively, the lateral surface of the light guide 2 can be provided with an opaque cover. It is likewise possible that the lateral surface of the light guide 2 has no particular modification and is formed by an untreated or not specially treated surface.

The light guide 2 serves to guide light emitted by the lighting means 3 into the light distribution body 1. For the coupling-in of the light into the light distribution body 1, the latter comprises a light coupling-in surface 11. In the assembled state, the light guide 2 is attached to the light coupling-in surface 11 with the light coupling-out surface 22. This can be seen in FIGS. 2 and 3, which show a schematic sectional illustration of the lighting device from FIG. 1. The lighting means 3 is attached to the light coupling-in surface 21 of the light guide. The light coupling-out surface 22 of the light guide 2 is attached to the light coupling-in surface 11 of the light distribution body 1. Thus, light emitted by the lighting means 3 is coupled into the light guide 2 via the light coupling-in surface 21. The light is then guided in the light guide 2 to the light coupling-in surface 11 of the light distribution body 1. The light is finally coupled into the light distribution body 1 from the light coupling-out surface 22 of the light guide 2 via the light coupling-in surface 11 of the light distribution body 1.

The light distribution body 1 in the exemplary embodiment shown in FIGS. 1 to 3 has a convex shape. Specifically, the light distribution body 1 illustrated there is substantially spherical. The shape of the light distribution body 1 deviates from a spherical shape only at the light coupling-in surface 11. The light coupling-in surface 11 in the exemplary embodiment shown in FIGS. 1 to 3 is of planar configuration-corresponding to the light coupling-out surface 22 of the light guide 2. This can be achieved for example by grinding the light distribution body 1 at the location of the light coupling-in surface 11. In other exemplary embodiments (not shown), the light coupling-in surface 11 of the substantially spherical light distribution body 1 is obtained by polishing a region of the spherical surface and is of convex configuration. In this case, the light coupling-out surface 22 of the light guide 2 is of concave configuration with a size and curvature corresponding to the size and curvature of the light coupling-in surface 11 of the light distribution body 1.

The light distribution body 1 is solid and is formed from a transparent material such as, for example, glass or transparent plastic. Glass is preferred as material for the light distribution body 1. In order to emit the coupled-in light, the light distribution body 1 has a light exit region 12 on its surface. In the case of the substantially spherical light distribution body 1 shown in FIGS. 1 to 3, the light exit region 12 is formed substantially by the entire surface of the light distribution body 1 with the exception of the light coupling-in surface 11.

The light exit region 12 of the light distribution body shown in FIGS. 1 to 3 is formed by a frosted or satin surface, that is to say a finely roughened surface, at which light is diffusely scattered in the interior of the light distribution body 1 and through which light emerges diffusely from the interior of the light distribution body 1. Such a surface can be obtained in the case of a light distribution body 1 composed of glass, for example by sandblasting or etching.

With the lighting device according to the exemplary embodiment shown in FIGS. 1 to 3, it is possible to generate an emission characteristic which contains both a directed portion and a diffuse portion. This is explained below with reference to FIGS. 4 to 6.

FIG. 4 shows a schematic illustration of the emission characteristic which can be achieved with the lighting device according to FIGS. 1 to 3. FIG. 5 shows a variation of the exemplary embodiment shown in FIGS. 1 to 3 without a light guide 2, with which an emission characteristic with a directed and diffuse portion can likewise be obtained.

Firstly, the emission characteristic of the lighting device with the configuration according to FIG. 4 is explained. Light which is emitted by the lighting means 3 is guided into the light distribution body 1 via the light guide 2. Exemplary beam paths through the light guide 2 are illustrated schematically by the arrows in the light guide 2. The lighting means 3 does not emit collimated light, but rather emits light over a certain angular range. In this case, reflections on the inner wall of the light guide 2 can also occur. Light which is coupled into the light distribution body 1 from the light guide 2 therefore enters the light distribution body 1 at different angles.

Since the light distribution body 1 is formed solidly from a transparent material, a first part of the coupled-in light which enters the light distribution body 1 at a sufficiently small angle with respect to the central axis of the lighting device illustrated in a dash-dotted manner is partially collimated or directed. This (first) part of the coupled-in light emerges from the light distribution body 1 in a directed manner in a region of the light exit region 12 which lies opposite the light coupling-in surface 11. This is illustrated in FIG. 4 by the solid arrows at the upper end of the light distribution body 1 which represent the directed portion of the emitted light.

A second part of the coupled-in light—namely substantially the light which does not emerge in a directed manner in the region of the light exit region 12 which lies opposite the light coupling-in surface 11—emerges diffusely from the light distribution body over the entire light exit region 12. As is illustrated conceptually in FIG. 4 by the small dotted arrows in the interior of the light distribution body 1, a part of the light which impinges on the frosted surface from the inside is reflected diffusely back into the interior of the light distribution body 1. As a result, the second part of the coupled-in light is distributed uniformly over the light distribution body 1 and emerges diffusely substantially over the entire light exit region 12 of the light distribution body 1. This is illustrated in FIG. 4 by the dotted arrows on the surface of the light distribution body 1 which represent the diffuse portion of the emitted light. On account of the frosted surface, additional scattering takes place when the light emerges from the light exit region 12.

In the exemplary embodiment shown in FIG. 5, no light guide 2 is present. Here, the light emitted by the lighting means 3 is coupled into the light distribution body 1 directly via the light coupling-in surface 11. However, the generation of directed and diffuse light takes place substantially analogously to the exemplary embodiment shown in FIG. 4 and described above. Once again, a (first) part of the coupled-in light is directed by the collimating effect of the solid light distribution body 1 and emerges in a directed manner over a part of the light exit region 12 which lies opposite the light coupling-in surface 11. A (second) part of the coupled-in light (substantially the part which does not emerge in a directed manner from the light distribution body 1) is distributed over the light distribution body 1 by internal reflections on the frosted surface and emerges diffusely through the frosted surface substantially over the entire light exit region 12.

The emission characteristic which can be achieved with the lighting device according to the present invention and in particular with the lighting devices shown in FIGS. 4 and 5 is formed from the superposition of a diffuse and a directed portion. This is illustrated schematically in the graph in FIG. 6. The polar angle θ of a spherical coordinate system with origin at the centre point of the light distribution body 1 is illustrated on the x-axis. A value of 0° denotes the direction along the central axis of the lighting device away from the light coupling-in surface 11. The intensity of the light which is emitted at the respective angle θ is specified without a specific unit on the y-axis.

The (first) portion of the emitted light, which forms the directed portion, emerges over a region of the light exit region 12 which lies opposite the light coupling-in surface 11. This directed light exit is illustrated in FIG. 6 as an increased emission intensity at small values of θ. The (second) portion of the emitted light, which forms the diffuse portion, is emitted diffusely substantially over the entire light exit region 12 and manifests itself as a constant background in the graph in FIG. 6.

Overall, with the lighting device according to the invention, therefore, an emission characteristic is generated with a directed portion for targeted lighting of a limited space region and a diffuse portion for uniform lighting of a large space region. In other words: the lighting device according to the invention is suitable to generate a spot lighting with a very soft spot which merges into a diffuse lighting portion which is emitted over virtually the full spherical angle. Surprisingly, the intensity of the diffuse portion is in this case so high that the diffuse portion permits a harmonious uniform lighting. At the same time, the intensity of the directed portion is so high that the directed portion generates a significantly brighter, soft spot with which a limited space region can be illuminated in a targeted manner.

The lighting device according to the invention emits both directed and diffuse light from the light distribution body 1, wherein only a single lighting means 3 is required for this purpose. For generating the emission characteristic with a directed and a diffuse portion, only one compact optical element is additionally required. The light distribution body 1 generates, from the coupled-in light, both a directed portion of emitted light over a limited spherical angle range and a diffuse portion of emitted light which is emitted over a very large spherical angle range.

The emission characteristic described with reference to FIGS. 4 to 6 can be changed in a suitable manner depending on the lighting requirement by simple modifications of the light distribution body 1. If it is desired, for example, that no light is emitted over a specific spherical angle range, corresponding regions of the surface of the light distribution body 1 can be excluded from the light exit region 12 by applying a cover or a reflective coating with total reflection. The use of a reflective coating is preferred in this case, since the light yield can thus be improved. Light which is reflected at the reflective coating in the interior of the light distribution body 1 can furthermore emerge from the light distribution body 1 via the light exit region 12.

FIGS. 7 and 8 show two schematic views of a lighting device with correspondingly modified light distribution body 1. The light distribution bodies 1 in FIGS. 7 and 8 are provided with a reflective coating 13 in regions. In the region of the reflective coating 13, no light emerges from the light distribution body 1, such that the regions with reflective coating 13 do not form part of the light exit region 12.

In the configuration shown in FIG. 7, a region of the surface of the light distribution body opposite the light coupling-in surface 11 is provided with a reflective coating 13. With this configuration, the portion of directed light is greatly suppressed. The remaining light exit region 12 emits substantially diffuse light which has been reflected at the reflective coating 13 in part in the interior of the light distribution body.

In the configuration shown in FIG. 8, a reflective coating 13 is applied over an annular region of the surface of the light distribution body 1. With this configuration, a superposition of directed and diffuse light is emitted in a region of the light exit region 12 which lies opposite the light coupling-in surface 11. A further part of the light exit region 12 adjoins the light coupling-in surface 11 and serves for emitting diffuse light. Between the two parts of the light exit region 12, a region in which no light is emitted is formed with the reflective coating 13.

Instead of a reflective coating 13, a tinting in regions on the surface of the light distribution body 1 or a coating having a reduced transmittance can also be provided. With this, the intensity of the emitted light in this region can be reduced or adjusted. The exemplary embodiments with a modified emission characteristic shown in FIGS. 7 and 8 can also be combined with the configuration of the lighting device without a light guide 2 illustrated in FIG. 5.

When a substantially spherical light distribution body 1 is used, the portion of the light coupled into the light distribution body 1 which is emitted in a directed manner is emitted over a surface region which lies opposite the light coupling-in surface 11. In order to be able to adjust the direction of the directed light component, the lighting device can be movably held. It is particularly preferred in this case to hold the lighting device such that the light distribution body 1 is mounted rotatably about its centre point. With such a mounting, the direction of the directed emitted light can be changed by rotation of the light distribution body 1 without the light distribution body 1 changing its absolute position.

This is illustrated in FIGS. 9 and 10. According to this exemplary embodiment, the lighting device is mounted in a schematically shown holder 4 such that the light distribution body 1 is rotatable about its centre point. In the position shown in FIG. 9, the directed light component which is emitted by the lighting device is emitted vertically upward. If the light distribution body 1 is rotated in the holder, the direction of the directed emitted light changes, as is illustrated in FIG. 10. However, the position of the light distribution body 1 remains unchanged. As a result, a lighting device having a small space requirement can be provided which has an emission characteristic with a diffuse component and a directed component, wherein the emission direction of the directed component is adjustable.

The configuration with a holder shown in FIGS. 9 and 10 can be combined both with the configuration shown in FIG. 5 without a light guide 2 and with a light distribution body 1 with a modified emission characteristic according to the exemplary embodiments described with reference to FIGS. 7 and 8.

In order to protect the light distribution body 1 and in particular its frosted surface from contaminations and damages, the lighting device can comprise a (transparent) dome which at least partially encloses the light distribution body 1. Such a configuration is shown in FIG. 11. In addition to the light distribution body 1, the light guide 2 and the lighting means 3, the lighting device comprises a dome 5 which surrounds the light distribution body 1. In order to improve the overall aesthetic impression, it is preferred in this exemplary embodiment if the lateral surface of the light guide 2 is provided with an opaque cover or coating (not shown). As a result, the visibility of the light guide 2 is reduced, so that the optical impression arises that the light distribution body 1 floats in the interior of the dome 5.

In order to modify the emission characteristic of the lighting device according to FIG. 11, the dome 5 can be provided with coatings with reduced transmittance in regions. This is illustrated schematically in FIG. 12. The dome 5 comprises a first (partially) reflective coating 51 in an upper region, and a second (partially) reflective coating 52 in an annular region around the upper region. The transmittances of the coatings 51, 52 differ from one another. Coatings with a transmittance of 0 can be used, i.e. fully reflective coatings, or partially reflective coatings with a transmittance between 0 and 1. Likewise, a tinting of the dome 5 in regions can be used in order to modify the emission characteristic of the lighting device.

Figure 12:
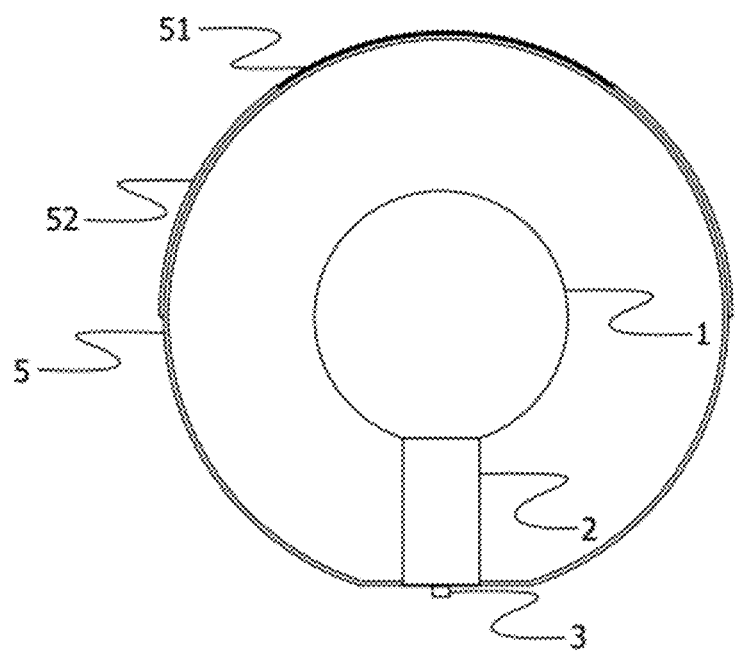
FIG. 12 shows an illustration of a variant of the exemplary embodiment shown in FIG. 11.

If, in the exemplary embodiment shown in FIG. 12, the first coating 51 is embodied as a fully reflective coating and the second coating 52 is embodied as a partially reflective coating, the directed portion of the light emitted by the light distribution body 1 is substantially fully reflected at the first coating 51. A portion emitted diffusely by the light distribution body 1 emerges through the region of the second coating 52, the intensity of said portion is reduced by the second coating 52. As a result, a glare-free lighting device with a diffuse emission characteristic over a limited space region is provided.

The configuration of the coatings 51, 52 shown in FIG. 12 is purely exemplary. It is obvious to a person skilled in the art that any desired combination and arrangement of coatings and/or tinted regions on the dome 5 can be used to achieve a desired modification of the emission characteristic of the lighting device. The dome 5 can additionally be configured to be removable and exchangeable. As a result, the emission characteristic of the lighting device can be modified by simply exchanging the dome 5 for a dome with a different configuration of the coatings and/or tintings, without a modification or change of the light distribution body 1 or of the lighting means 3 being required.

It is obvious to a person skilled in the art that the exemplary embodiments shown in FIGS. 11 and 12 with the dome 5 can be combined with the other exemplary embodiments described herein.

LIST OF REFERENCE SIGNS

1 Light distribution body
11 light coupling-in surface
12 light exit region
13 reflective coating
2 light guide
21 (second) light coupling-in surface
22 light coupling-out surface
3 lighting means
4 holder
5 dome
51 first (partially) reflective coating
52 second (partially) reflective coating

The invention claimed is:

1. Lighting device, in particular for lighting an interior, comprising:
   a lighting means;
   a light distribution body having a light coupling-in surface and a translucent light exit region;
   wherein the light distribution body is configured to emit a first part of the light emitted by the lighting means and introduced into the light distribution body via the light coupling-in surface in a directed manner, and to scatter a second part of the introduced light by means of the light distribution body, so that the light exits diffusely substantially over the entire light exit region of the light distribution body.

2. Lighting device according to claim 1, comprising a light guide which is configured to guide light emitted by the lighting means to the light coupling-in surface of the light distribution body.

3. Lighting device according to claim 1, wherein the light distribution body is formed by a substantially spherical body made of a transparent material, preferably glass or a transparent plastic.

4. Lighting device according to claim 1, wherein the light exit region of the light distribution body is formed by a frosted surface.

5. Lighting device according to claim 1, wherein the light coupling-in surface is formed by a smoothly ground or polished region on the surface of the light distribution body.

6. Lighting device according to claim 1, wherein the lighting means is formed by one or more LEDs.

7. Lighting device according to claim 1, wherein the light distribution body has, on its surface, regions with a reflective coating which is configured to partially or completely reflect light which propagates in the interior of the light distribution body and impinges on the reflective coating.

8. Lighting device according to claim 1, comprising a holder in which the light distribution body is mounted rotatably about its centre point.

9. Lighting device according to claim 1, comprising a dome which encloses the light distribution body.

10. Lighting device according to claim 9, wherein the dome comprises surface regions with different transmittance, which are configured to modify the emission characteristic of the light distribution body.

11. Lighting device according to claim 1, wherein the lighting means is formed by one or more LEDs configured as an LED cluster or LED RGB module.

12. Lighting device according to claim 9, wherein the dome comprises surface regions with different transmittance, which comprise partially reflective coatings and are configured to modify the emission characteristic of the light distribution body.

* * * * *